(12) United States Patent
Kurashima et al.

(10) Patent No.: US 12,063,500 B2
(45) Date of Patent: Aug. 13, 2024

(54) CONTROL APPARATUS, RADIO COMMUNICATION SYSTEM, CONTROL METHOD, AND PROGRAM

(71) Applicant: NEC Corporation, Tokyo (JP)

(72) Inventors: Akihisa Kurashima, Tokyo (JP); Tetsuo Yama, Tokyo (JP); Hideaki Tsuoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 343 days.

(21) Appl. No.: 17/600,190

(22) PCT Filed: Apr. 1, 2020

(86) PCT No.: PCT/JP2020/015059
§ 371 (c)(1),
(2) Date: Sep. 30, 2021

(87) PCT Pub. No.: WO2020/209161
PCT Pub. Date: Oct. 15, 2020

(65) Prior Publication Data
US 2022/0182823 A1 Jun. 9, 2022

(30) Foreign Application Priority Data
Apr. 11, 2019 (JP) .................. 2019-075370

(51) Int. Cl.
*H04W 12/06* (2021.01)
*H04W 12/72* (2021.01)
*H04W 76/10* (2018.01)

(52) U.S. Cl.
CPC ........... *H04W 12/06* (2013.01); *H04W 12/72* (2021.01); *H04W 76/10* (2018.02)

(58) Field of Classification Search
CPC ...... H04W 12/06; H04W 12/72; H04W 76/10
See application file for complete search history.

(56) References Cited

U.S. PATENT DOCUMENTS

| 9,451,443 | B1* | 9/2016 | Martell | H04W 88/02 |
| 2015/0024710 | A1* | 1/2015 | Becker | H04W 12/06 |
| | | | | 455/411 |

(Continued)

FOREIGN PATENT DOCUMENTS

| JP | 2006-013626 A | 1/2006 |
| JP | 2017-142822 A | 8/2017 |

(Continued)

OTHER PUBLICATIONS

Japanese Office Action for JP Application No. 2021-513598, mailed on Oct. 25, 2022 with English Translation.

(Continued)

*Primary Examiner* — Justin Y Lee
(74) *Attorney, Agent, or Firm* — Sughrue Mion, PLLC

(57) ABSTRACT

A control apparatus that implements access control of a user in a private radio communication network is provided. The control apparatus includes an obtaining unit and a verifying unit. The obtaining unit obtains subscriber information related to a subscriber in a private radio communication network. The verifying unit performs authentication processing for a terminal apparatus requesting connection to the private radio communication network, based on authentication information included in the subscriber information. The verifying unit verifies access authority for the terminal apparatus requesting the connection, based on information different from the authentication information included in the subscriber information when the authentication processing for the terminal apparatus requesting the connection is successful.

2 Claims, 15 Drawing Sheets

(56) References Cited

U.S. PATENT DOCUMENTS

| | | |
|---|---|---|
| 2016/0007190 A1 | 1/2016 | Wane |
| 2017/0201876 A1 | 7/2017 | Tamagawa |
| 2018/0041954 A1 | 2/2018 | Tamura |
| 2018/0234386 A1 | 8/2018 | Row, II |
| 2018/0249015 A1 | 8/2018 | Nakano et al. |
| 2018/0288622 A1 | 10/2018 | Maria |
| 2019/0069328 A1 | 2/2019 | Sharma |
| 2020/0053541 A1 | 2/2020 | Makabe |
| 2021/0329583 A1* | 10/2021 | Baek .................... H04W 48/18 |

FOREIGN PATENT DOCUMENTS

| | | |
|---|---|---|
| JP | 2019-012969 A | 1/2019 |
| JP | 2019-508962 A | 3/2019 |
| WO | 2016/139919 A1 | 9/2016 |
| WO | 2016/148229 A1 | 9/2016 |
| WO | 2018/194125 A1 | 10/2018 |

OTHER PUBLICATIONS

English translation of Written opinion for PCT Application No. PCT/JP2020/015059, mailed on Jun. 9, 2021.
International Search Report for PCT Application No. PCT/JP2020/015059, mailed on Jun. 9, 2020.
JP Office Action for JP Application No. 2023-004397, mailed on Mar. 19, 2024 with English Translation.

* cited by examiner

60: SUBSCRIBER INFORMATION DATABASE

| SIM PROVIDER ID | IMSI | OPc | K VALUE | TERM OF VALIDITY |
|---|---|---|---|---|
| A01 | B01 | X001 | Y001 | xx:xx:01 |
| A01 | B02 | X002 | Y002 | xx:xx:02 |
| A02 | B03 | X003 | Y003 | xx:xx:03 |
| A00 | B00 | X099 | Y099 | — |

Fig.6

TA INFORMATION

| IMSI | TAI |
|------|-----|
| 20-1 | #1 |
| 20-2 | #1 |
| 21-1 | #2 |
| 21-2 | #2 |

| 22-1 | #1,#2 |

Fig.11

CONTROL APPARATUS, RADIO COMMUNICATION SYSTEM, CONTROL METHOD, AND PROGRAM

This application is a National Stage Entry of PCT/JP2020/015059 filed on Apr. 1, 2020, which claims priority from Japanese Patent Application 2019-075370 filed on Apr. 11, 2019, the contents of all of which are incorporated herein by reference, in their entirety.

BACKGROUND

Technical Field

The present invention relates to a control apparatus, a radio communication system, a control method, and a program.

Background Art

In recent years, as a mobile network system, Long Term Evolution (LTE)/Evolved Packet Core (EPC) defined by the Third Generation Partnership Project (3GPP) has come into wide use.

In the mobile network system such as LTE, usually, telecommunications operators (carriers) construct and manage base stations, core networks, and the like, and provide radio connection for users. In other words, mobile communication operators referred to as Mobile Network Operators (MNOs) construct communication line networks, and provide communication services. Further, in recent years, provision of communication services by Mobile Virtual Network Operators (MVNOs; virtual mobile communication operators) that borrow a communication network from the MNOs has been widely implemented as well.

In addition, companies or the like have started to construct their original mobile radio communication networks (hereinafter simply referred to as "radio communication networks") based on technology of mobile phones instead of the MNO or the MNVO. In other words, construction of radio communication networks referred to as private LTE has been undertaken.

PTL 1 describes that charges related to communication and charges related to services that can be provided for a user are unitarily managed based on user identification information. PTL 1 discloses a system of unifying charging management for a user of a terminal using communication facilities of a plurality of carriers.

PTL 2 describes that a communication system in which a user can flexibly select an operator is provided. PTL 2 discloses that information related to a communication operator including a charging condition and the like when a carrier provides services is transmitted to a terminal, and the terminal can thereby select a carrier to use based on the information.

PTL 3 describes that convenience of a user when communication capacity of a Subscriber Identity Module (SIM) card is increased is enhanced. PTL 3 discloses that a server on the web transmits a command to increase communication capacity of the SIM card to a management system that manages the communication capacity of the SIM card.

PTL 4 describes that a large number of users are enabled to easily start the use in a management method and a management server for using a plurality of SIM cards. PTL 4 discloses that register information for registering a SIM card is received, and the SIM card whose identification number is specified with the received register information is associated with a user Identifier (ID) of a user of a plurality of SIM cards.

CITATION LIST

Patent Literature

[PTL 1] WO 2016/148229 A1
[PTL 2] WO 2016/139919 A1
[PTL 3] JP 2019-012969 A
[PTL 4] JP 2017-142822 A

SUMMARY

Technical Problem

As described above, construction of radio communication networks by companies or the like referred to as private LTE has been started. In private LTE, apparatuses necessary for construction of a radio communication network are laid in a base or premises of the companies or the like. Specifically, a base station and a core network node (for example, a Mobility Management Entity (MME)) being nodes of a Radio Access Network (RAN) are laid in the premises of the companies or the like.

Here, in private LTE, control of the base station and control and management related to users are based on management, control, and the like of existing LTE. Thus, authentication of a terminal that can use private LTE is necessary in private LTE as well. Specifically, a Subscriber Identity Module (SIM) provider needs to issue a SIM card, and the SIM card needs to be inserted into the terminal.

The SIM provider provides authentication information for implementing user authentication (subscriber authentication) for an operator (network operator) of private LTE. The authentication information is stored in a core network, and is occasionally referred to at the time of provision of communication services for the terminal. Specifically, the authentication is performed as follows: the authentication information is stored in a Home Subscriber Server (HSS), and the MME compares the authentication information stored in the SIM card of the terminal and the authentication information stored in the HSS.

The provision of the subscriber information by the SIM provider is performed based on a contract between the SIM provider and the network operator of private LTE. In this case, it is rare that a term of validity of the subscriber information provided from the SIM provider is indefinite, and a "valid period" is set to the subscriber information. Thus, access to a network (private LTE) with the subscriber information whose valid period has passed needs to be rejected.

As a further developed form of private LTE, it is considered that a plurality of companies or organizations share one core network. In this case, although a core network (core network node) and a Public Land Mobile Network (PLMN) ID being physical facilities are shared by a plurality of companies or the like, the plurality of companies are entities different from each other. Thus, management related to network access of users (for example, employees) of each company is required to be performed separately.

For example, private LTE in which a company A and a company B share one core network is considered. In this case, access to the network by employees of the company A and access to the network by employees of the company B are required to be managed independently of each other. For example, a countermeasure that access to the network by terminals of the company B is rejected on the floor of the company A or the like is necessary. This is because, unless such a countermeasure is taken, access to the network by the terminals of the company B limits access to the network by the terminals of the company A, which is not reasonable.

In existing LTE, access control of users is in many cases performed by a server different from the core network node (for example, the MME or the like). For example, access control of users according to charge plans is in many cases performed by a server provided with a Policy and Charging Rule Function (PCRF) disclosed in PTL 1. The server also serves to control a policy of each subscriber, and as a part thereof, also performs the charging processing. Note that, in addition to the PCRF, an original charging server may be provided.

Thus, it is assumed that the external server is also laid in private LTE, and the external server executes the access control of users. However, such an external server as above has a significant number of functions, and is often expensive. Incorporating an expensive external server into the system despite the construction of private LTE for the purpose of implementing radio connection to an external network at low costs is contradictory to the purport of the construction of private LTE.

The present invention has a main example object to provide a control apparatus, a radio communication system, a control method, and a program that implement access control of a user in a private radio communication network.

Solution to Problem

According to the first perspective of the present invention, provided is a control apparatus including: an obtaining unit configured to obtain subscriber information related to a subscriber in a private radio communication network; and a verifying unit configured to perform authentication processing for a terminal apparatus requesting connection to the private radio communication network, based on authentication information included in the subscriber information, and to verify access authority for the terminal apparatus requesting the connection, based on information different from the authentication information included in the subscriber information when the authentication processing for the terminal apparatus requesting the connection is successful.

According to the second perspective of the present invention, provided is a radio communication system including: an obtaining means for obtaining subscriber information related to a subscriber in a private radio communication network; and a verifying means for performing authentication processing for a terminal apparatus requesting connection to the private radio communication network, based on authentication information included in the subscriber information, and verifying access authority for the terminal apparatus requesting the connection, based on information different from the authentication information included in the subscriber information when the authentication processing for the terminal apparatus requesting the connection is successful.

According to the third perspective of the present invention, provided is a control method used in a control apparatus that controls mobility of a terminal apparatus, the control method comprising the steps of: obtaining subscriber information related to a subscriber in a private radio communication network; and performing authentication processing for a terminal apparatus requesting connection to the private radio communication network, based on authentication information included in the subscriber information, and verifying access authority for the terminal apparatus requesting the connection, based on information different from the authentication information included in the subscriber information when the authentication processing for the terminal apparatus requesting the connection is successful.

According to the fourth perspective of the present invention, provided is a program that causes a computer mounted on a control apparatus controlling mobility of a terminal apparatus to execute: obtaining subscriber information related to a subscriber in a private radio communication network; performing authentication processing for a terminal apparatus requesting connection to the private radio communication network, based on authentication information included in the subscriber information; and verifying access authority for the terminal apparatus requesting the connection, based on information different from the authentication information included in the subscriber information when the authentication processing for the terminal apparatus requesting the connection is successful.

Advantageous Effects of Invention

According to each perspective of the present invention, the control apparatus, the radio communication system, the control method, and the program that implement access control of a user in a private radio communication network are provided. Note that, according to the present invention, instead of or together with the above effects, other effects may be exerted.

BRIEF DESCRIPTION OF THE DRAWINGS

FIG. 6 is a diagram illustrating an example of information stored in a subscriber information database according to the first example embodiment;

FIG. 11 is a diagram illustrating an example of TA information according to the second example embodiment;

DESCRIPTION OF THE EXAMPLE EMBODIMENTS

Figure 1:
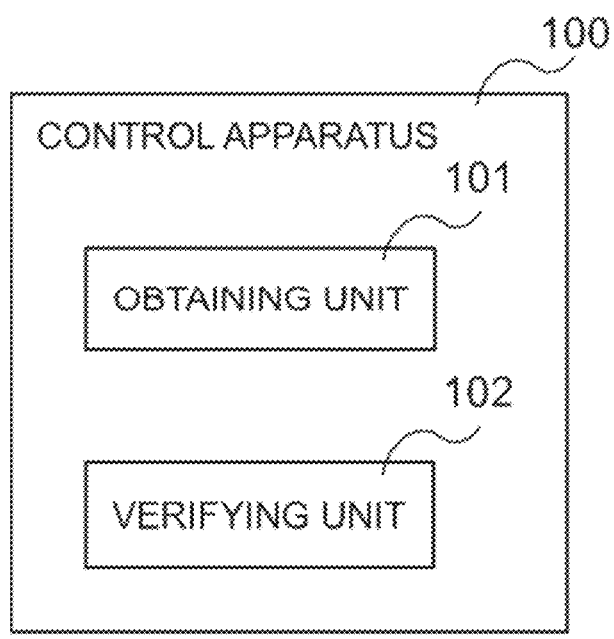
FIG. 1 is a diagram for describing an overview of an example embodiment.

First of all, an overview of an example embodiment will be described. Note that reference signs in the drawings added in the overview are added to respective elements for the sake of convenience as an example to facilitate better understanding, and the description of the overview is not to set limitations by any means. Note that, in the Specification and drawings, elements to which the similar descriptions are applicable are denoted by the same reference signs, and overlapping descriptions may hence be omitted.

A control apparatus 100 according to an example embodiment includes an obtaining unit 101 and a verifying unit 102 (see FIG. 1). The obtaining unit 101 obtains subscriber information related to a subscriber in a private radio communication network. The verifying unit 102 performs authentication processing for a terminal apparatus that requests connection to the private radio communication network, based on authentication information included in the subscriber information. When authentication of the terminal apparatus that requests the connection is successful, the verifying unit 102 verifies access authority of the terminal apparatus that requests the connection, based on information different from the authentication information included in the subscriber information.

In addition to the authentication using the authentication information described in a SIM card, the control apparatus 100 verifies access authority of the terminal apparatus, based on information (for example, a term of validity of the subscriber information) different from the authentication information. The control apparatus 100 implements the authentication and verification by itself. As a result, access of the terminal apparatus to a radio network is appropriately controlled without using an external charging server or the like that may be over-engineered in private LTE.

Specific example embodiments will be described below in further detail with reference to the drawings.

First Example Embodiment

The first example embodiment will be described in further detail with reference to the drawings.

<Configuration of System>

Figure 2:
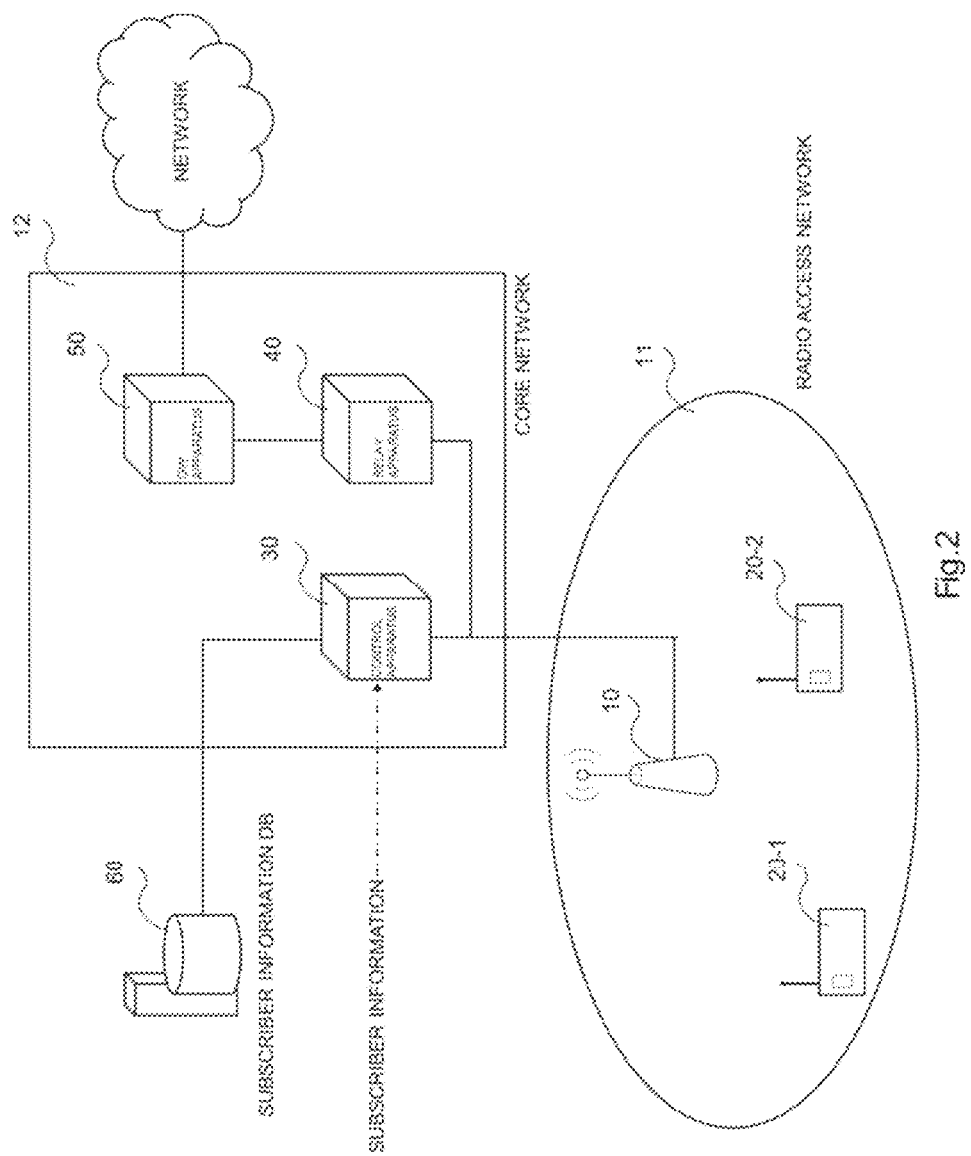
FIG. 2 is a diagram illustrating an example of a schematic configuration of a radio communication system according to the first example embodiment.

FIG. 2 is a diagram illustrating an example of a schematic configuration of a radio communication system according to the first example embodiment. The radio communication system according to the first example embodiment is a system in which an end user performs operation and management of the system. Specifically, an end user installs a node constituting the radio communication system in their own premises or the like, and performs management of the node and the like. Note that the management of the node by the end user also includes management of apparatuses installed on the cloud.

The first example embodiment presupposes a radio communication system in which an entity (end user) such as a company is a network operator. For example, the network operator constructs the radio communication system (private radio communication network) by using a private facility corresponding to the LTE scheme conforming to 3GPP.

With reference to FIG. 2, the radio communication system includes a radio access network 11 and a core network 12.

The radio access network 11 includes a base station 10 as a node. The base station 10 provides radio connection for terminal apparatuses 20-1 and 20-2. Note that, in the following description, the terminal apparatuses 20-1 and 20-2 are simply referred to as "terminal apparatus 20" unless there is a special reason for distinguishing the terminal apparatuses 20-1 and 20-2.

When the terminal apparatus 20 is located within coverage of the base station 10, the terminal apparatus 20 performs radio communication with the base station 10. For example, the terminal apparatus 20 is a User Equipment (UE). Examples of the terminal apparatus 20 include mobile terminal apparatuses such as a smartphone, a mobile phone, a gaming machine, and a tablet, a computer (a personal computer, a laptop personal computer), and the like. Alternatively, the terminal apparatus 20 may be an Internet of Things (IoT) terminal emitting radio waves, a Machine Type Communication (MTC) terminal, or the like. Note that the terminal apparatus 20 is not to be limited to these examples. The terminal apparatus 20 according to the disclosure of the present application can be any device that transmits radio waves.

Note that the system configuration illustrated in FIG. 2 is an example, and as a matter of course, the system configuration is not to limit the number of base stations 10 and terminal apparatuses 20. For example, the number of terminal apparatuses 20 included in the system may be one, or may be three or more.

The core network 12 is a network that connects the base station 10 and an external network (for example, the Internet). The core network 12 includes network nodes such as a control apparatus 30, a relay apparatus 40, and a gateway (GW) apparatus 50.

The core network 12 is divided into a control plane (C-Plane) that transmits signals of the start and the end of communication by the terminal apparatus 20 and signals necessary for handover, and a user plane (U-Plane) that transmits user data.

The control apparatus 30 transmits and receives signals necessary for communication between the base station 10 and the control plane. The control apparatus 30 mainly controls mobility of the terminal apparatus 20. One of control by the control apparatus 30 is access control of the terminal apparatus 20. Details of the access control of the terminal apparatus 20 by the control apparatus 30 will be described later.

The relay apparatus 40 is an apparatus that relays user data between the base station 10 and the user plane.

The gateway apparatus 50 is arranged at the boundary between the core network 12 and the external network, and transmits and receives packets related to the user data.

A subscriber information database 60 stores the subscriber information. Input and output of information of the subscriber information database 60 are controlled by the control apparatus 30.

When the radio communication system according to the first example embodiment is a system conforming to LTE, the control apparatus 30 corresponds to a Mobility Management Entity (MME). The relay apparatus 40 corresponds to a Serving Gateway (S-GW). The gateway apparatus 50 corresponds to a PDN Gateway (P-GW). The subscriber information database 60 corresponds to a Home Subscriber Server (HSS).

Note that, as a matter of course, the radio communication system according to the disclosure of the present application is not to be limited to LTE. The disclosure of the present application can also be applied to radio communication systems prior to LTE (for example, Third Generation (3G)) and radio communication systems of the next generation (for example, Fifth Generation (5G)).

When the radio communication system is 5G, the control apparatus 30 corresponds to an Access and Mobility Management Function (AMF) and the subscriber information database 60 corresponds to a Unified Data Management (UDM).

In FIG. 2, the subscriber information database 60 is not illustrated as a node of the core network 12, but the subscriber information database 60 may be handled as a core network node. The subscriber information database 60 may be handled as one of elements in the core network 12.

<General Operation of System>

With reference to FIG. 2, general operation of the radio communication system according to the first example embodiment will be described.

The operation of the radio communication system according to the first example embodiment includes two phases.

The first phase is a phase in which information (hereinafter referred to as subscriber information) related to the terminal apparatus 20 that receives provision of radio communication services from the base station 10 is registered in the subscriber information database 60.

The second phase is a phase (hereinafter referred to as an authority verification phase) in which access authority of the terminal apparatus 20 that requests provision of radio connection services is verified.

<Registration Phase>

Prior to the operation of the system, a network operator (a company or the like that operates and manages the radio communication system by itself) requests a SIM provider to generate subscriber information. The SIM provider generates the subscriber information in response to the request.

The network operator provides the SIM provider with information (hereinafter referred to as customer information) necessary for generating the subscriber information. For example, an Identifier (ID) of the network operator and the like correspond to the customer information.

The subscriber information generated by the SIM provider includes an Integrated Circuit Card ID (ICCID) being information specific to a SIM card, an International Mobile Subscriber Identity (IMSI) being a contract identification number, authentication information, a term of validity related to the subscriber information, and the like. The authentication information is information used for verification (proof) as to whether or not the terminal apparatus attempting to use the radio communication network has validity thereof. The authentication information corresponds to, for example, information referred to as an OPc/K value.

The SIM provider generates the subscriber information in accordance with the customer information provided from the network operator. The SIM provider writes the generated subscriber information in the SIM card and delivers the SIM card to the network operator. The SIM card is inserted into the terminal apparatus 20. Note that, in the SIM card, the subscriber information with a term of validity may be written, or the subscriber information without a set term of validity may be written.

The subscriber information generated by the SIM provider is provided for the network operator, and the network operator or the SIM provider registers the subscriber information in the core network 12 (more accurately, the control apparatus 30).

The control apparatus 30 obtains the subscriber information with a term of validity. The control apparatus 30 registers the obtained subscriber information in the subscriber information database 60.

<Authority Verification Phase>

When the control apparatus 30 receives a connection request (for example, an attach request) from the terminal apparatus 20, the control apparatus 30 obtains the subscriber information of the SIM card embedded in the terminal apparatus 20 via the base station 10.

The control apparatus 30 searches the subscriber information database 60 by using a part of information (for example, the IMSI) of the obtained subscriber information as a search key, and obtains the subscriber information corresponding to the terminal apparatus 20 from which the connection request is received.

Subsequently, the control apparatus 30 compares the authentication information related to the terminal apparatus 20 that issued the connection request and the authentication information obtained from the subscriber information database 60. When the two pieces of authentication information match as a result of the comparison, the control apparatus 30 confirms the term of validity related to the subscriber information of the terminal apparatus 20 that issued the connection request.

The control apparatus 30 determines whether or not the term of validity of the subscriber information is left. When the term of validity of the subscriber information is left, the control apparatus 30 accepts the connection request of the terminal apparatus 20. When the term of validity of the subscriber information is expired, the control apparatus 30 rejects the connection request of the terminal apparatus 20.

<Configuration of Control Apparatus>

Next, an internal configuration (processing configuration) of the control apparatus 30 will be described.

Figure 3:
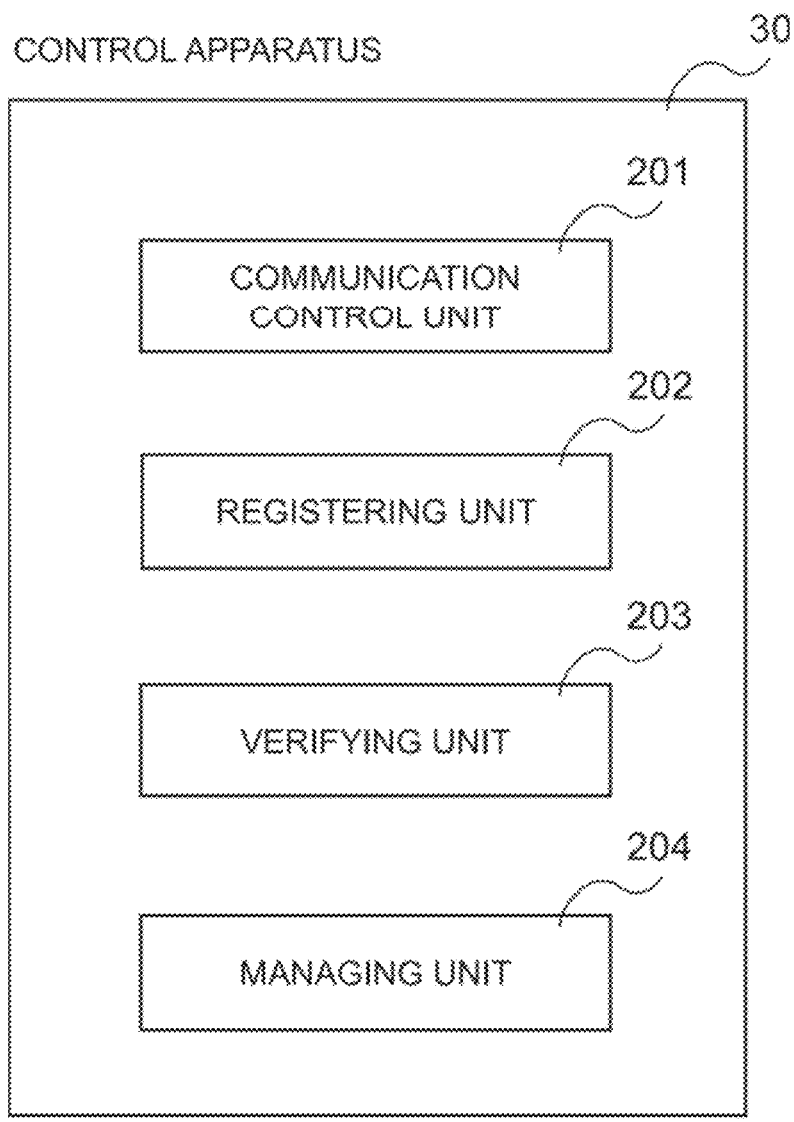
FIG. 3 is a diagram illustrating an example of a processing configuration of a control apparatus according to the first example embodiment.

FIG. 3 is a diagram illustrating an example of a processing configuration (processing module) of the control apparatus 30 according to the first example embodiment. With reference to FIG. 3, the control apparatus 30 includes a communication control unit 201, a registering unit 202, a verifying unit 203, and a managing unit 204.

The communication control unit 201 is a means that controls communication with another apparatus (for example, the base station 10, the subscriber information database 60, or the like). The communication control unit 201 includes the function of the obtaining unit 101.

The registering unit 202 is a means that registers the subscriber information obtained from the SIM provider in the subscriber information database 60.

There may be various methods in which the registering unit 202 obtains the subscriber information from the SIM provider.

Figure 4:
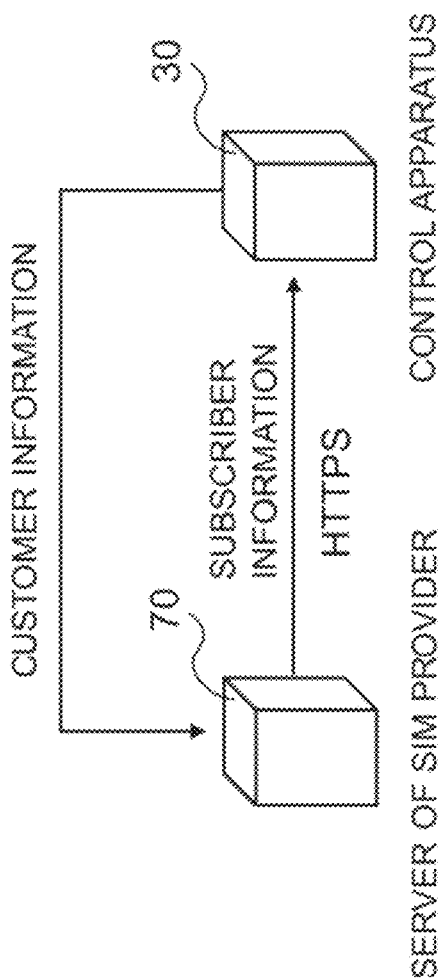
FIG. 4 is a diagram for describing operation of the control apparatus according to the first example embodiment.

For example, the registering unit 202 obtains the subscriber information from the SIM provider via a network (online obtaining of information; see FIG. 4). In this case, as illustrated in FIG. 4, the control apparatus 30 and a server 70 of the SIM provider are connected with the network, and the subscriber information is provided via the network. Note that it is desirable that the control apparatus 30 and the server 70 of the SIM provider be connected with a secure communication path such as Hypertext Transfer Protocol Secure (HTTPS).

Figure 5:
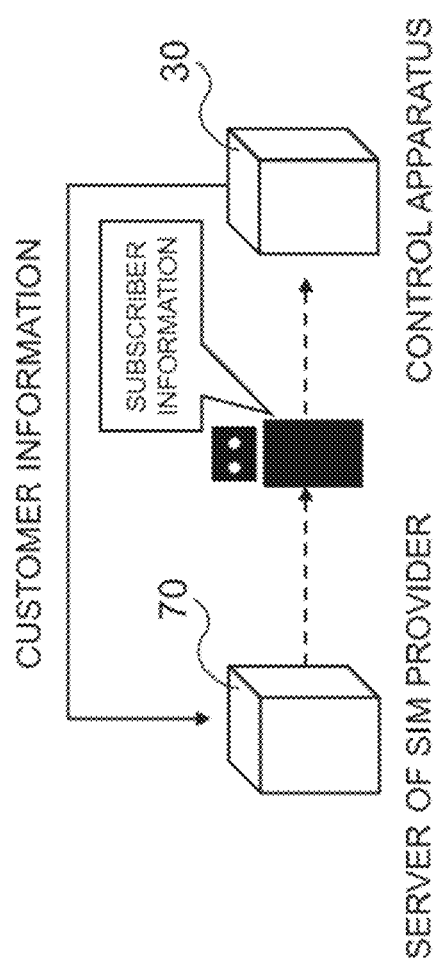
FIG. 5 is a diagram for describing operation of the control apparatus according to the first example embodiment.

The registering unit 202 may obtain the subscriber information using a storage medium such as a Universal Serial Bus (USB) memory (offline obtaining of information; see FIG. 5). Note that, in such a case, it is desirable that the subscriber information provided with a password in consideration of security be stored in the storage medium.

Alternatively, a system administrator may access a website provided by the SIM provider with a terminal such as a smartphone, and a server of the website may transmit a two-dimensional code including contents of the subscriber information to the terminal. The system administrator may cause the two-dimensional code to be displayed on a screen of the smartphone, and a core network apparatus (control apparatus 30) may read the subscriber information from the two-dimensional code. An example of the two-dimensional code is a Quick Response (QR) code (registered trademark).

When the registering unit 202 stores the obtained subscriber information in the subscriber information database 60, a database as illustrated in FIG. 6 is constructed.

With reference to FIG. 6, each entry of the subscriber information database 60 consists of fields of a SIM provider Identifier (ID), an IMSI, authentication information (OPc, K value), and a term of validity.

The SIM provider ID is information for identifying the SIM provider that generated the subscriber information. For example, the SIM provider ID may be generated based on an issuer identification number (IIN) included in the Integrated Circuit Card ID (ICCID) being one piece of data written in the SIM, or a Fully Qualified Domain Name (FQDN) may be used as the SIM provider ID. Alternatively, the SIM provider ID may be separately determined according to an arrangement made with the SIM provider. For example, the SIM provider ID is generated in the following manner: correspondence between the ICCID included in the subscriber information and the SIM provider is stored in a storage unit of the control apparatus 30 in advance, and the registering unit 202 refers to the information as appropriate.

Note that, as illustrated in FIG. 6, different SIM provider IDs may be registered in the subscriber information database 60. This signifies that the SIM card is distributed from one SIM provider to a plurality of network operators. In other words, the subscriber information generated by a plurality of SIM providers may be registered in the subscriber information database 60. Note that, as a matter of course, only the subscriber information generated by a specific SIM provider may be registered in the subscriber information database 60. Note that, as described above, subscriber information generated by a plurality of SIM providers is written in the subscriber information database 60. Thus, in order to specify which SIM provider generated each piece of subscriber information, the subscriber information and the SIM provider ID are associated with each other and registered in the subscriber information database 60.

Although the registering unit 202 registers the authentication information with a set term of validity in the subscriber information database 60 in principle, there are exceptions. For example, the term of validity is not set in the subscriber information generated for test use of the radio communication system. For example, the subscriber information illustrated in the lowest row of FIG. 6 is information created for test use, and the term of validity is not set.

The subscriber information for test use is not information provided by the SIM provider. Thus, the network operator (system administrator) may directly input the subscriber information of the test use to the control apparatus 30. For example, the network operator may input the subscriber information by using a storage medium such as a USB memory, or may input the subscriber information manually by using a keyboard or the like.

The registering unit 202 not only adds an entry (subscriber information) to the subscriber information database 60, but updates the subscriber information as well. For example, regarding the subscriber information obtained from the SIM provider, when there is an entry in which the SIM provider ID and the IMSI match in the subscriber information database 60, the registering unit 202 overwrites the entry with the obtained subscriber information.

Alternatively, when the subscriber information obtained from the SIM provider satisfies a predetermined condition, the registering unit 202 may issue a "warning" to an email address and a monitoring apparatus to be described later. For example, examples of the predetermined condition include a case in which the term of validity of the obtained subscriber information is shorter than the term of validity of corresponding subscriber information registered in the database, a case in which there is a change in the authentication information, and the like.

Such a short term of validity of the subscriber information does not occur frequently, and the registering unit 202 notifies the administrator before registering such subscriber information. The fact that there is a change in the authentication information of the obtained subscriber information means that the SIM card has been issued, and the administrator confirms the cause of the reissue of the SIM card (for example, loss of the terminal) or the like.

Description is given with reference to FIG. 3 again. The verifying unit 203 is a means that verifies whether or not the terminal apparatus 20 that issued the connection request has authority to use a radio network (for example, private LTE).

The verifying unit 203 performs authentication processing for the terminal apparatus that requests the connection to the private radio communication network, based on the authentication information included in the subscriber information related to the subscriber in the private radio communication network.

The verifying unit 203 obtains the subscriber information included in the connection request. More specifically, the verifying unit 203 obtains at least the IMSI and the authentication information (for example, OPc, K value) from the subscriber information.

The verifying unit 203 searches the subscriber information database 60 by using the obtained IMSI as a search key.

When there is an entry hit by the search key, the subscriber information database 60 returns each field value (SIM provider ID, IMSI, OPc, K value, term of validity) of the entry to the verifying unit 203. When there is no entry hit by the search key, the subscriber information database 60 returns an indication of no hit entries to the verifying unit 203.

When obtaining of the subscriber information from the subscriber information database 60 is successful, the verifying unit 203 compares the authentication information obtained from the terminal apparatus 20 via the base station 10 with the authentication information obtained from the subscriber information database 60, and performs authentication processing for the terminal apparatus 20.

When authentication of the terminal apparatus 20 is successful, the verifying unit 203 verifies access authority of the terminal apparatus 20 that requests the connection, based on information different from the authentication information included in the subscriber information.

Specifically, when authentication of the terminal apparatus 20 is successful, the verifying unit 203 confirms whether or not the term of validity of the subscriber information described in the SIM card is left. The verifying unit 203 compares the date (current date) in a case of access authority verification and the date described in the term of validity of the subscriber information obtained from the database, and when the date described in the term of validity of the subscriber information is older than the date in the case of the access authority verification, the verifying unit 203 determines that the term of validity is expired.

The verifying unit 203 confirms validity of the terminal apparatus 20 that issued the connection request, and when the verifying unit 203 confirms that the subscriber information corresponding to the terminal is within the term of validity, the verifying unit 203 permits access of the terminal to the radio network.

When the verifying unit 203 cannot confirm the validity of the terminal apparatus 20 that issued the connection request, or when the term of validity of the subscriber information corresponding to the terminal is expired, the verifying unit 203 rejects access of the terminal to the radio network.

The verifying unit 203 notifies the terminal apparatus 20 of verification results (access permitted, access rejected) of the access authority via the base station 10.

The managing unit 204 is a means that controls and manages the subscriber information stored in the subscriber information database 60. The managing unit 204 accesses the subscriber information database 60 periodically or at a predetermined timing, and performs maintenance of the information registered in the database. Alternatively, the managing unit 204 may access the subscriber information database 60 in response to a command from the administrator, and perform maintenance of the information registered in the database.

The managing unit 204 deletes the subscriber information satisfying a predetermined condition out of the subscriber information registered in the subscriber information database 60.

For example, the managing unit 204 confirms whether or not the term of validity of the entry obtained from the subscriber information database 60 is expired, and when there is an entry whose term of validity is expired, the managing unit 204 deletes the entry from the subscriber information database 60.

Regarding an entry whose term of validity is expired, the managing unit 204 may delete the entry after a predetermined period (for example, one week) has elapsed since the expiration of the term of validity, instead of deleting the entry immediately.

Prior to the deletion of the entry (immediate deletion, deletion after the elapse of a predetermined period), the managing unit 204 may notify the network operator (administrator of the system) of the existence of the entry that requires the deletion. Specifically, an email address or the like may be stored in the control apparatus 30, and the managing unit 204 may perform the notification to the email address. In such a case, the managing unit 204 follows an explicit command (for example, deletion of the entry, deferment of deletion of the entry) from the administrator. Note that, when a plurality of email addresses are stored in the control apparatus 30, the managing unit 204 performs the notification to the plurality of email addresses.

The managing unit 204 may notify a monitoring apparatus of the existence of the entry that requires the deletion (subscriber information satisfying the predetermined condition), instead of notifying to the email address. For example, the managing unit 204 may perform the notification to a local monitoring apparatus connected to the core network 12, or may perform the notification to a remote monitoring apparatus connected to an external network.

The administrator that has confirmed the existence of the entry that requires the deletion via the email address and the monitoring apparatus performs operation according to contents of the entry. For example, when the entry being notified is unnecessary, the administrator commands the control apparatus 30 to delete the entry. Alternatively, when the entry being notified is necessary, the administrator requests the SIM provider to reissue the subscriber information.

The managing unit 204 may confirm the term of validity of the entry obtained from the subscriber information database 60, and when the left period of the term of validity is shorter than a predetermined period, the managing unit 204 may notify email address and the monitoring apparatus that the left period is shorter than the predetermined period (expiration of the term of validity is approaching). In this case, the administrator performs operation such as requesting the SIM provider to extend the term of validity of the subscriber information, as necessary.

Note that the control apparatus 30 can be implemented by adding the above-described various processing functions (registration function, access authority verification function, and the like) to the MME defined in 3GPP or the like. Thus, description related to other functions of the control apparatus 30 will be omitted.

<Configuration of Other Apparatuses>

Apparatuses other than the control apparatus 30 constituting the radio communication system according to the first example embodiment can be implemented with existing apparatuses, and thus description of a processing configuration and the like thereof will be omitted. Existing methods may be used for generation of the subscriber information by the SIM provider, and the SIM provider according to the disclosure of the present application may set a term of validity for the subscriber information. Thus, detailed description related to the SIM provider and the server 70 of the SIM provider will be omitted.

<Operation of System>

Next, with reference to the drawings, operation of a radio communication system according to the first example embodiment will be described.

Figure 7:
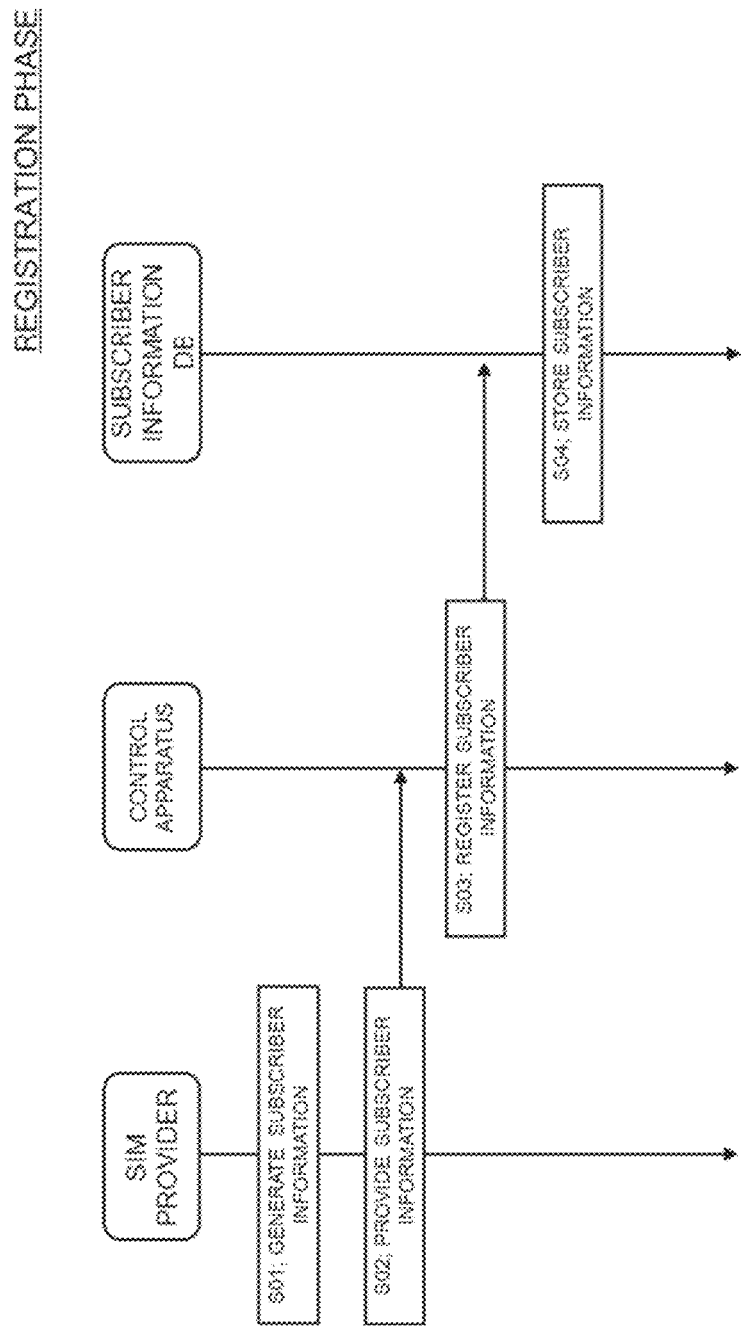
FIG. 7 is a sequence diagram illustrating an example of operation related to a registration phase of the radio communication system according to the first example embodiment.

FIG. 7 is a sequence diagram illustrating an example of operation related to the registration phase of the radio communication system according to the first example embodiment.

First of all, the SIM provider generates the subscriber information (Step S01). In this case, the SIM provider sets a term of validity for the subscriber information. The SIM provider provides the generated subscriber information for the control apparatus 30 (Step S02).

When the control apparatus 30 obtains the subscriber information with a set term of validity, the control apparatus 30 registers the subscriber information with the subscriber information database 60 (Step S03).

The subscriber information database 60 stores the subscriber information (Step S04).

Figure 8:
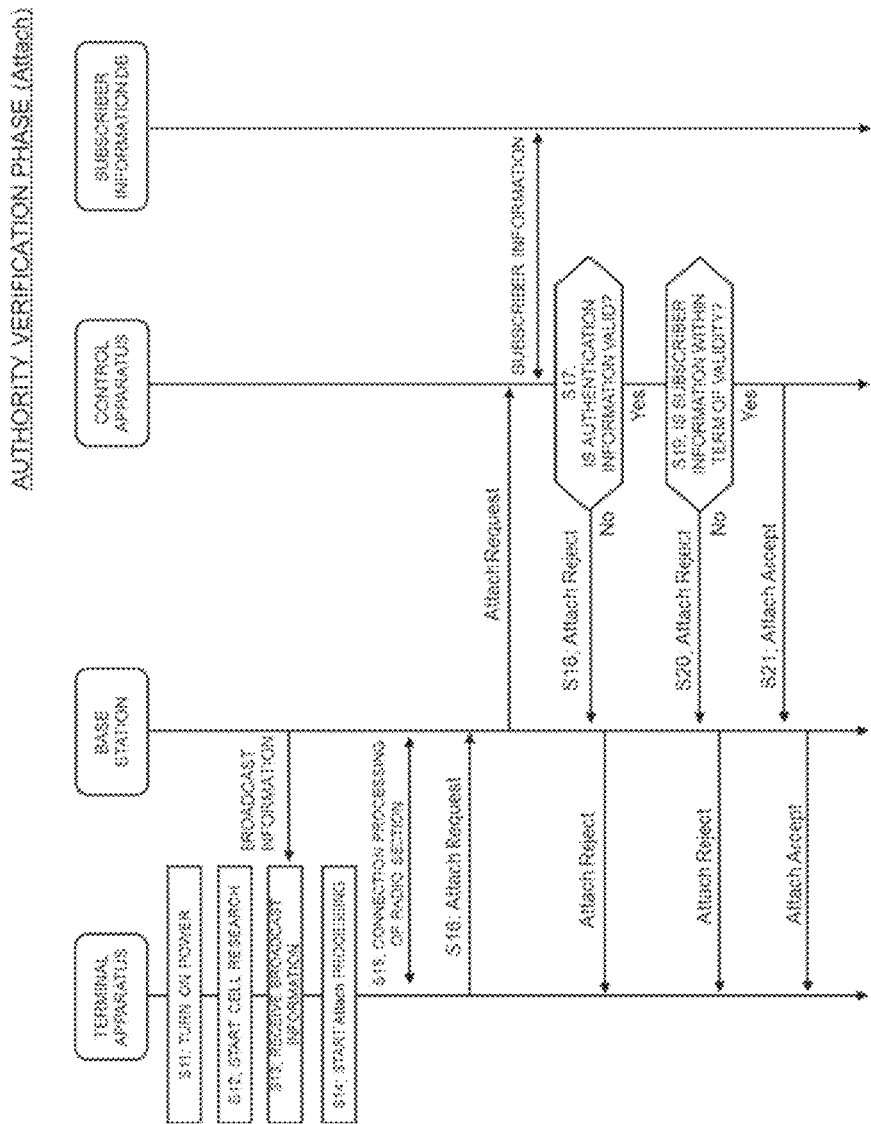
FIG. 8 is a sequence diagram illustrating an example of operation related to an authority verification phase of the radio communication system according to the first example embodiment.

FIG. 8 is a sequence diagram illustrating an example of operation related to the authority verification phase of the radio communication system according to the first example embodiment. First of all, with reference to FIG. 8, system operation in a case of attach of the terminal apparatus 20 will be described.

First of all, the terminal apparatus 20 receives operation to turn on power by a user (Step S11). The terminal apparatus 20 starts cell search (Step S12). Specifically, the terminal apparatus 20 obtains the IMSI stored in the SIM card, and confirms a Public Land Mobile Network (PLMN) or the like. Subsequently, the terminal apparatus 20 starts cell search.

The terminal apparatus 20 receives broadcast information from the base station 10 (Step S13). When the terminal apparatus 20 receives broadcast information of the best cell, the terminal apparatus 20 starts attach (Attach) processing (Step S14). Specifically, connection processing of a radio section is performed between the terminal apparatus 20 and the base station 10 (Step S15). In this case, transmission and reception of RRC_Connection_Request/Setup is performed between the terminal apparatus 20 and the base station 10.

Subsequently, the terminal apparatus 20 transmits an attach request (Attach Request) to the base station 10 (Step S16). Specifically, the terminal apparatus 20 transmits the attach request including a Tracking Area Code (TAC) in which the terminal apparatus 20 was last served and a Globally Unique Temporary Identifier (GUTI) of the terminal apparatus 20 to the base station 10.

After the base station 10 confirms that it is the first connection from the terminal apparatus 20, the base station 10 forwards the attach request obtained from the terminal apparatus 20 to the control apparatus 30.

The control apparatus 30 extracts the subscriber information from the obtained attach request, and searches the subscriber information database 60 by using the IMSI and the like as a search key. The subscriber information database 60 returns the subscriber information of search results when there is a matching entry.

The control apparatus 30 determines whether or not the authentication information of the terminal apparatus 20 that performed the attach request is valid by using the authentication information (authentication information described in the SIM card) extracted from the attach request and the authentication information registered in the subscriber information database 60 (Step S17).

When the authentication information is invalid (Step S17, No branch), the control apparatus 30 returns an attach reject (Attach Reject) to the terminal apparatus 20 via the base station 10 (Step S18). In this case, the control apparatus 30 sets any one of #12 (Tracking are not allowed), #13 (Roaming not allowed in this tracking area), #15 (No suitable cells in tracking area), and #22 (Congestion) to an EMM cause value of the attach reject. The attach reject including these cause values is handled as an error response that can be retried.

When the authentication information is valid (Step S17, Yes branch), the control apparatus 30 determines whether or not the authentication information extracted from the attach request is within the term of validity (Step S19).

When the term of validity of the authentication information is expired (Step S19, No branch), the control apparatus 30 returns an attach reject (Attach Reject) to the terminal apparatus 20 via the base station 10 (Step S20). In this case as well, the control apparatus 30 sets any one of #12, #13, #15, and #22 to the EMM cause value of the attach reject.

When the term of validity of the authentication information is not expired (Step S19, Yes branch), the control apparatus 30 returns an attach accept (Attach Accept) to the terminal apparatus 20 via the base station 10 (Step S21).

Figure 9:
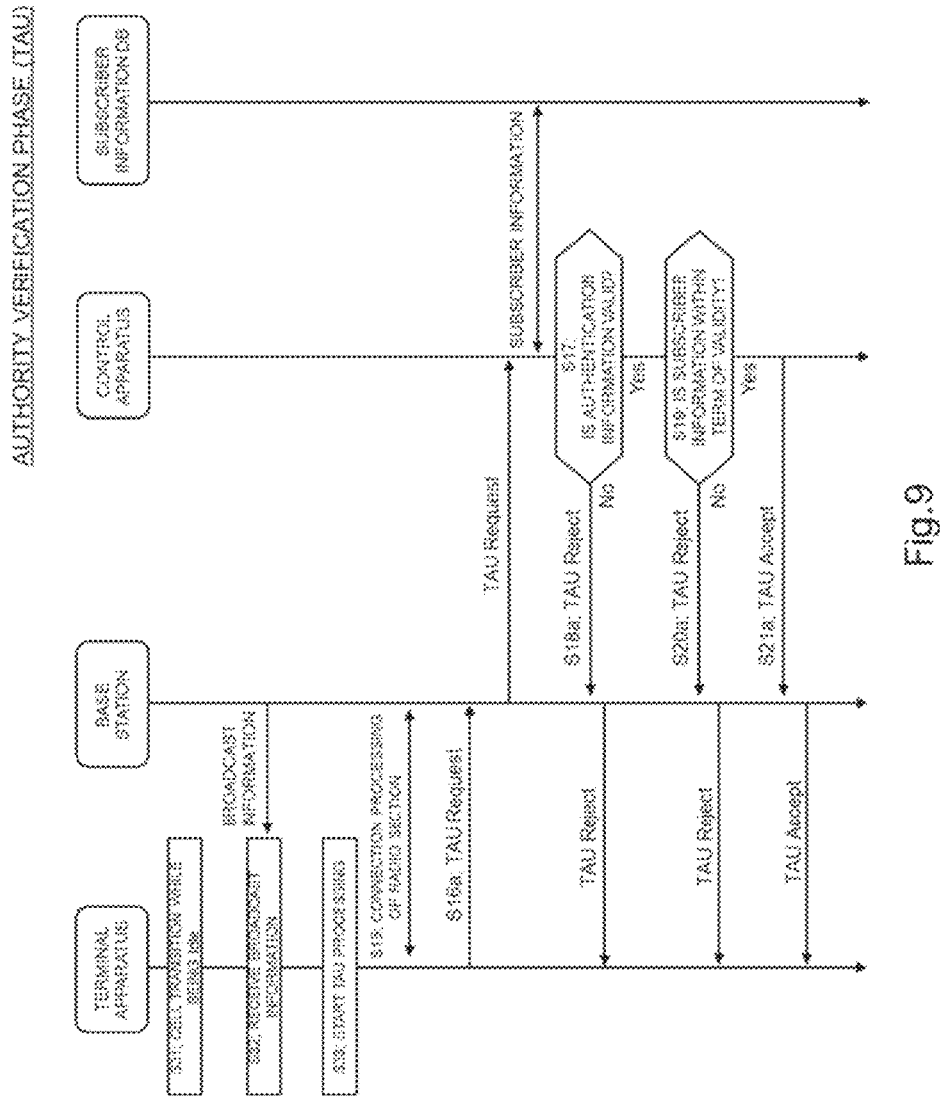
FIG. 9 is a sequence diagram illustrating an example of operation related to an authority verification phase of the radio communication system according to the first example embodiment.

FIG. 9 is a sequence diagram illustrating an example of operation related to the authority verification phase of the radio communication system according to the first example embodiment. With reference to FIG. 9, system operation in a case of Tracking Area Update (TAU) of the terminal apparatus 20 will be described.

Note that, in FIG. 8 and FIG. 9, the same processes are denoted by the same reference signs (steps), and description thereof will thus be omitted. With reference to FIG. 8 and FIG. 9, operations of the terminal apparatus 20 before the connection processing of the radio section (Step S15) are different. Note that, in FIG. 8, the message exchanged between the apparatuses is a message related to attach, whereas in FIG. 9, a message related to TAU is a message exchanged between the apparatuses. The difference is obvious to those of ordinary skill in the art, and detailed description thereof will thus be omitted.

The start of the authority verification phase in a case of TAU is triggered by the terminal apparatus 20 performing cell transition while the terminal apparatus 20 is in an idle state (Step S31). When the terminal apparatus 20 transitions its cell, the terminal apparatus 20 receives broadcast information of a transition target cell from the base station 10 (Step S32).

Subsequently, the terminal apparatus 20 starts TAU processing (Step S33). Specifically, the terminal apparatus 20 confirms the TAC with the broadcast information. The terminal apparatus 20 compares the TAC described in the Tracking Area Identity (TAI) list registered in the terminal apparatus 20 and the TAC of the cell. As a result of the comparison, the two TACs are different from each other, and thus the terminal apparatus 20 starts the TAU processing.

The system operation of Step S15 and the subsequent steps of FIG. 9 is basically the same as the operation in a case of the attach processing described with reference to FIG. 8. In other words, authentication of the terminal using the authentication information is performed in the case of TAU as well. Subsequently, authority using the term of validity of the subscriber information is verified. When the authentication information described in the SIM card and the authentication information registered in the subscriber information database 60 do not match, or when the term of validity of the subscriber information is expired, the cause value of any one of #12, #13, #15, and #22 described above is transmitted to the terminal apparatus 20.

In this manner, the control apparatus 30 receives an attach request or a TAU request from the terminal apparatus 20 that requests connection. When the control apparatus 30 rejects the connection request of the terminal apparatus 20 that requests the connection, the control apparatus 30 transmits a response message with a predetermined value stored in the cause value to the terminal apparatus 20. In other words, the control apparatus 30 sets any one of #12, #13, #15, and #22 to a reason (cause value) for rejection in a case of access reject of the terminal apparatus 20 due to the attach processing and access reject due to the TAU processing.

As described above, the control apparatus 30 according to the first example embodiment performs two-step authentication and verification operation related to the terminal apparatus 20. First of all, the control apparatus 30 performs authentication processing by using the authentication information of the subscriber information registered in the SIM card and the authentication information of the subscriber information registered in the subscriber information database 60. Next, the control apparatus 30 verifies access authority of the terminal apparatus 20 by using the term of validity of the subscriber information.

In this manner, when the terminal apparatus 20 connects to the radio network system, the control apparatus 30 executes necessary authentication and verification. As a result, the need of an external apparatus such as a charging server is eliminated, and access control in the private radio communication network such as private LTE can be implemented on an appropriate scale. By setting the term of validity to the subscriber information provided by the SIM provider, a contract made with the network administrator can be enabled. In other words, even when the SIM provider and the core network are not connected (even in a case of offline), the SIM provider can appropriately manage and control the term of validity of the subscriber information.

Second Example Embodiment

Next, the second example embodiment will be described in detail with reference to the drawings.

In the first example embodiment, the access authority verification processing of the second step is performed using the term of validity of the subscriber information. The second example embodiment will describe a case in which the access authority verification processing of the second step is performed based on the Tracking Area (TA) accommodating the terminal apparatus 20. Note that, in the second example embodiment, the term of validity may be set to the subscriber information generated by the SIM provider, or the term of validity may not be set.

The first example embodiment presupposes a case in which one network operator exclusively uses one radio communication system. However, the nodes of the core network 12 may be shared by a plurality of network operators. For example, as illustrated in FIG. 10, the core network node, the PLMN ID, and the like may be shared by a plurality of network operators.

When a network operator A and a network operator B are different entities (different companies) but are tenants of the same building, the core network (EPC) may be shared. Alternatively, when the network operator A and the network operator B are different departments of the same company (for example, an accounting department and an engineering department) as well, their respective terminal apparatuses 20 may be managed separately, but the core network node, the PLMN ID, and the like may be shared.

Figure 10:
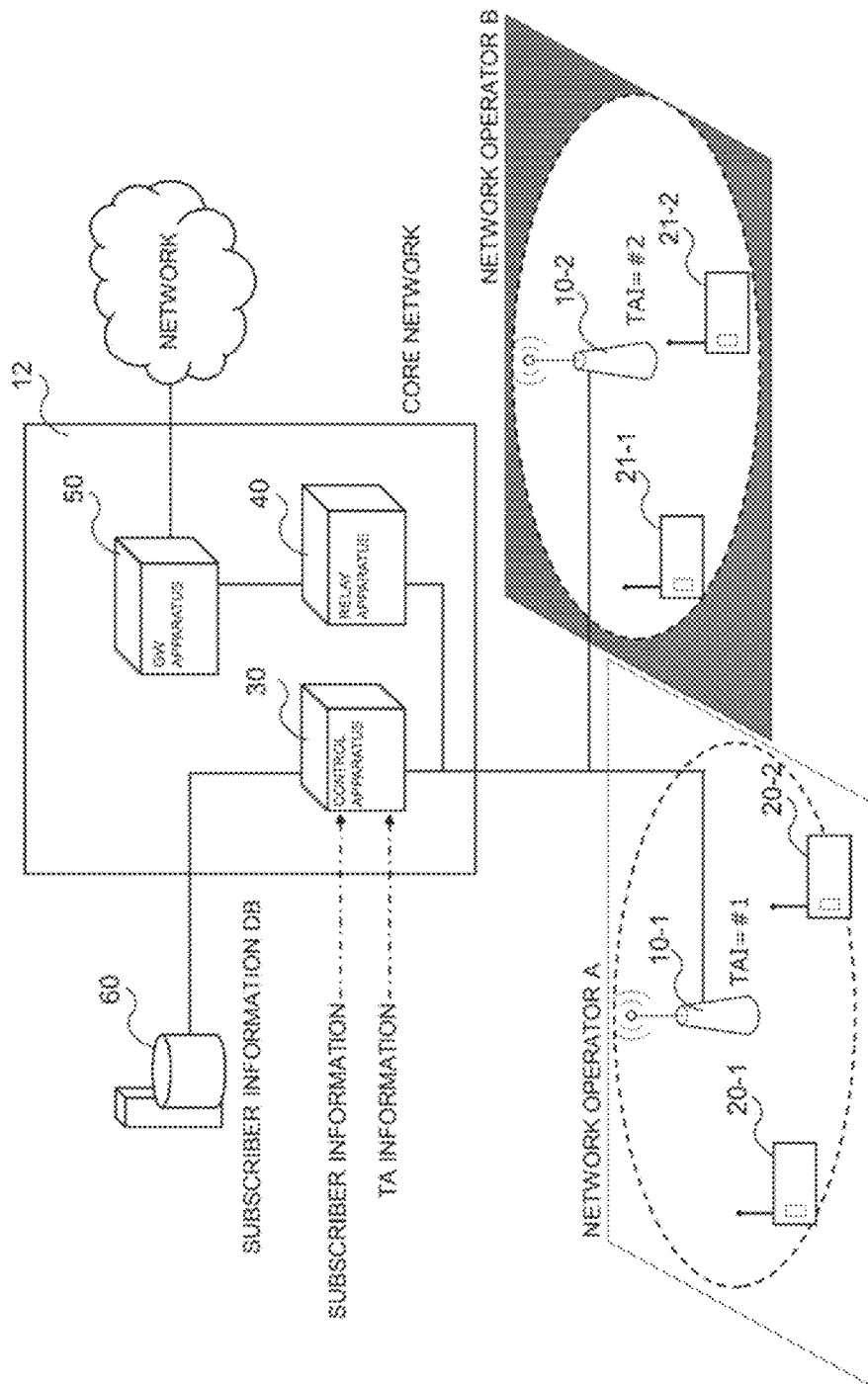
FIG. 10 is a diagram illustrating an example of a schematic configuration of a radio communication system according to the second example embodiment.

In the case of the situation as illustrated in FIG. 10, in the floor of the network operator A, access to the radio network by terminal apparatuses 21-1 and 21-2 of the network operator B is required to be rejected (restricted).

The second example embodiment will describe access control related to the terminal apparatus 20 when the network is shared by different network operators. In this case, the control apparatus 30 according to the second example embodiment verifies access authority of the terminal apparatus 20 by using information of a servable tracking area for the terminal apparatus 20 that requests connection.

FIG. 10 is a diagram illustrating an example of a schematic configuration of a radio communication system according to the second example embodiment. The control apparatus 30 controls and manages mobility of the terminal apparatuses 20-1, 20-2, 21-1, and 21-2 connected via a plurality of base stations 10-1 and 10-2. In this case, the control apparatus 30 performs verification of access authority related to the terminal apparatus 20, based on TA information defining a servable TA for each terminal apparatus 20.

In the "registration phase" according to the second example embodiment, the TA information is input to the control apparatus 30, in addition to the subscriber information. The control apparatus 30 stores the TA information in an internal storage unit. Note that storage of the TA information is performed by an administrator of the communication system or the like. Alternatively, the TA information may be stored in an external server or the like, and the control apparatus 30 may obtain the TA information from the external server.

An internal configuration of the control apparatus 30 according to the second example embodiment may be the same as the internal configuration of the control apparatus 30 according to the first example embodiment, and thus description corresponding to FIG. 3 will be omitted. In the second example embodiment, operation of the verifying unit 203 is different from that of the first example embodiment.

The communication control unit 201 according to the second example embodiment obtains the TA information. The TA information is stored in an internal storage unit or the like. FIG. 11 is a diagram illustrating an example of the TA information. Note that, in FIG. 11, the reference signs of the terminal apparatuses 20 and 21 illustrated in FIG. 10 are illustrated as identifiers of the respective terminals (in FIG. 11, the IMSI is used). With reference to FIG. 11, the terminal apparatus 20 and its servable TAI are associated with each other and registered in the TA information. Note that, as a matter of course, one terminal apparatus 20 may be permitted to be served in a plurality of TAs (see the lowest row of FIG. 11).

The verifying unit 203 according to the second example embodiment confirms the access authority described in the first example embodiment, based on the TA information.

Figure 12:
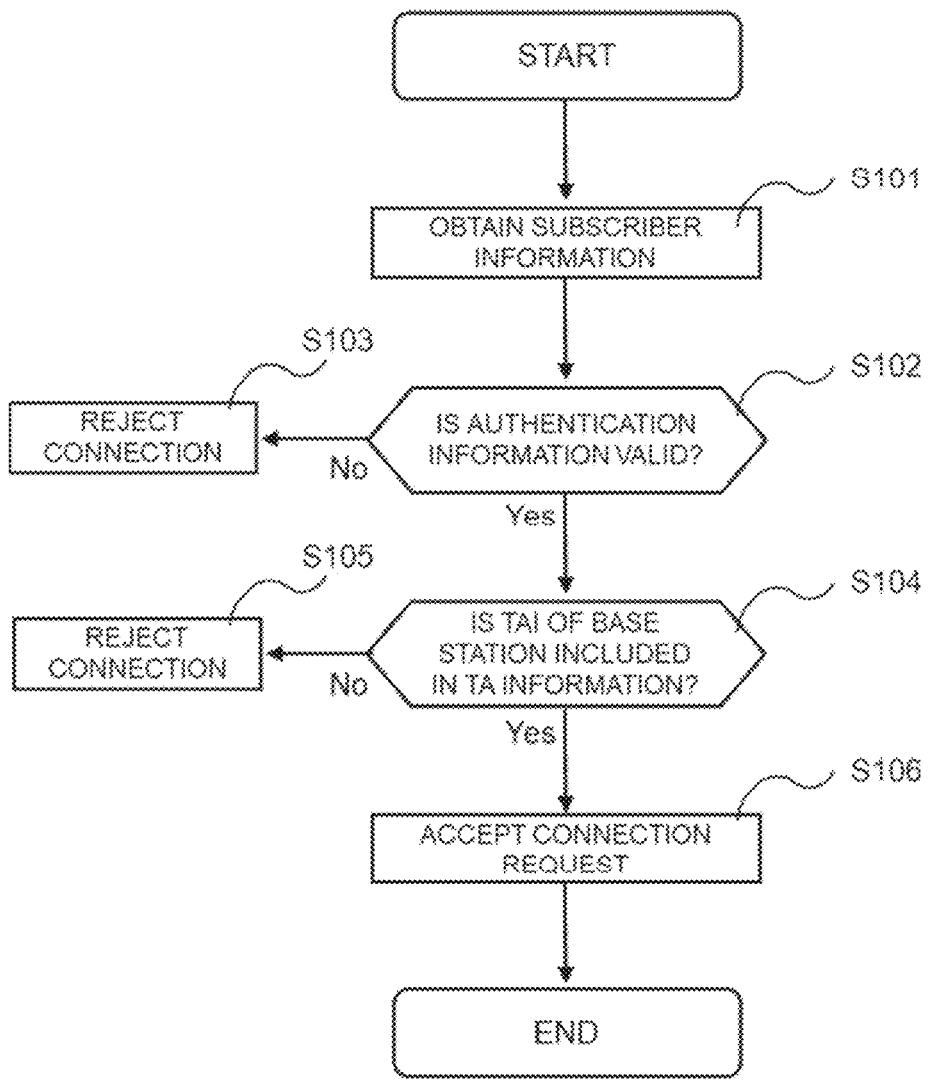
FIG. 12 is a flowchart illustrating an example of operation of a verifying unit according to the second example embodiment.

FIG. 12 is a flowchart illustrating an example of operation of the verifying unit 203 according to the second example embodiment.

As described in the first example embodiment, when the verifying unit 203 receives a connection request (attach request, TAU request) from the terminal apparatus 20, the verifying unit 203 obtains corresponding subscriber information from the subscriber information database 60 (Step S101).

The verifying unit 203 compares the authentication information obtained via the base station 10 and the authentication information obtained from the subscriber information database 60, and determines whether or not the authentication information of the terminal apparatus 20 that requests network connection is valid (Step S102).

When the authentication information is invalid (Step S102, No branch), the verifying unit 203 rejects the connection (Step S103). For example, the verifying unit 203 transmits an attach reject (Attach Reject) and a TAU reject (TAU Reject) to the terminal apparatus 20 via the base station 10.

When the authentication information is valid (Step S102, Yes branch), the verifying unit 203 verifies access authority of the terminal apparatus 20 that performed the connection request, based on the TA information (Step S104). Specifically, the verifying unit 203 performs the verification, depending on whether or not the TAI for specifying the cell of the base station 10 that forwarded the connection request of the terminal apparatus 20 is included in the TAI in which the terminal apparatus 20 is permitted to be served.

When the terminal apparatus 20 does not transmit the connection request via the base station 10 that forms the cell of the TAI in which serving is permitted (Step S104, No branch), the verifying unit 203 rejects the connection (Step S105). For example, the verifying unit 203 transmits an attach reject (Attach Reject) and a TAU reject (TAU Reject) to the terminal apparatus 20 via the base station 10.

When the terminal apparatus 20 transmits the connection request via the base station that forms the cell of the TAI in which serving is permitted (Step S104, Yes branch), the verifying unit 203 accepts the connection request of the terminal apparatus 20 (Step S106). For example, the verifying unit 203 transmits an attach accept (Attach Accept) and a TAU accept (TAU Accept) to the terminal apparatus 20 via the base station 10.

Note that information in which the base station 10 and the TAI assigned to the base station 10 are associated with each other is input to the control apparatus 30 in advance. The TAI assigned to the base station 10 is also input to the base station 10 as a parameter. The base station 10 broadcasts the TAI assigned to the base station 10 to the terminal apparatus 20. With the terminal apparatus 20 describing the TAI included in the broadcast information from the base station 10 in the connection request and transmitting the connection request, the control apparatus 30 knows the TAI for specifying the cell of the base station 10 that forwarded the connection request. Alternatively, when the base station 10 forwards the connection request from the terminal apparatus 20 to the control apparatus 30, the base station 10 may notify the control apparatus 30 of the TAI of the base station 10.

For example, the following assumes a case in which the terminal apparatus 20-1 transmits the connection request to the control apparatus 30 via the base station 10-1 in the example of FIG. 10. The TAI for uniquely specifying the cell provided by the base station 10-1 is "#1". With reference to FIG. 11, the TAI in which the terminal apparatus 20-1 is permitted to be served is "#1". Thus, the verifying unit 203 permits the connection of the terminal apparatus 20-1 via the base station 10-1.

The following assumes a case in which the terminal apparatus 21-1 transmits the connection request to the control apparatus 30 via the base station 10-1 in FIG. 10. With reference to FIG. 11, the TAI in which the terminal apparatus 21-1 is permitted to be served is "#2". Thus, the verifying unit 203 rejects the connection of the terminal apparatus 21-1 via the base station 10-1.

As described above, the control apparatus 30 according to the second example embodiment verifies access authority of the terminal apparatus 20, based on the TA information determined in advance. In other words, when the terminal apparatus 20 transmits the connection request from the base station 10 in which connection is permitted, the control apparatus 30 determines that the terminal has access authority, and permits the connection. In contrast, when the terminal apparatus 20 transmits the connection request from the base station 10 in which connection is not permitted, the control apparatus 30 determines that the terminal does not have access authority, and rejects the connection. As a result, even when the network node is shared by different companies or the like such as in a case of multi-tenant LTE, appropriate access control is implemented.

Third Example Embodiment

Next, the third example embodiment will be described in detail with reference to the drawings.

In the second example embodiment, the control apparatus 30 verifies access authority of the terminal apparatus 20 that issued the connection request, based on the TA information. In this case, when the TAI of the cell provided by the base station 10 that forwarded the connection request is not included in the TA information, the control apparatus 30 rejects network access of the terminal apparatus 20 that issued the connection request.

However, in such operation, it is assumed that there may be inconvenience when two entities sharing the core network are different departments of the same company or the like. For example, in the example of FIG. 10, the terminal apparatuses 21-1 and 21-2 belonging to the network operator B may desire to secure minimum radio connection even when the terminal apparatuses 21-1 and 21-2 move to the floor of the network operator A.

In order to meet such a demand, the control apparatus 30 according to the third example embodiment assigns a rank of access authority for the terminal apparatus 20 that requests connection, based on results of verification based on of the TA information. In addition, the control apparatus 30 controls the communication band of the terminal apparatus 20, based on the assigned access authority.

For example, in the above-described example, a low rank is assigned to the terminal apparatuses 21-1 and 21-2 of the network operator B that moved to the floor of the network operator A. The control apparatus 30 controls (commands) the base station 10 and the gateway apparatus 50 so that the communication band of the terminal apparatuses 21-1 and 21-2 assigned the low rank is narrowed.

Figure 13:
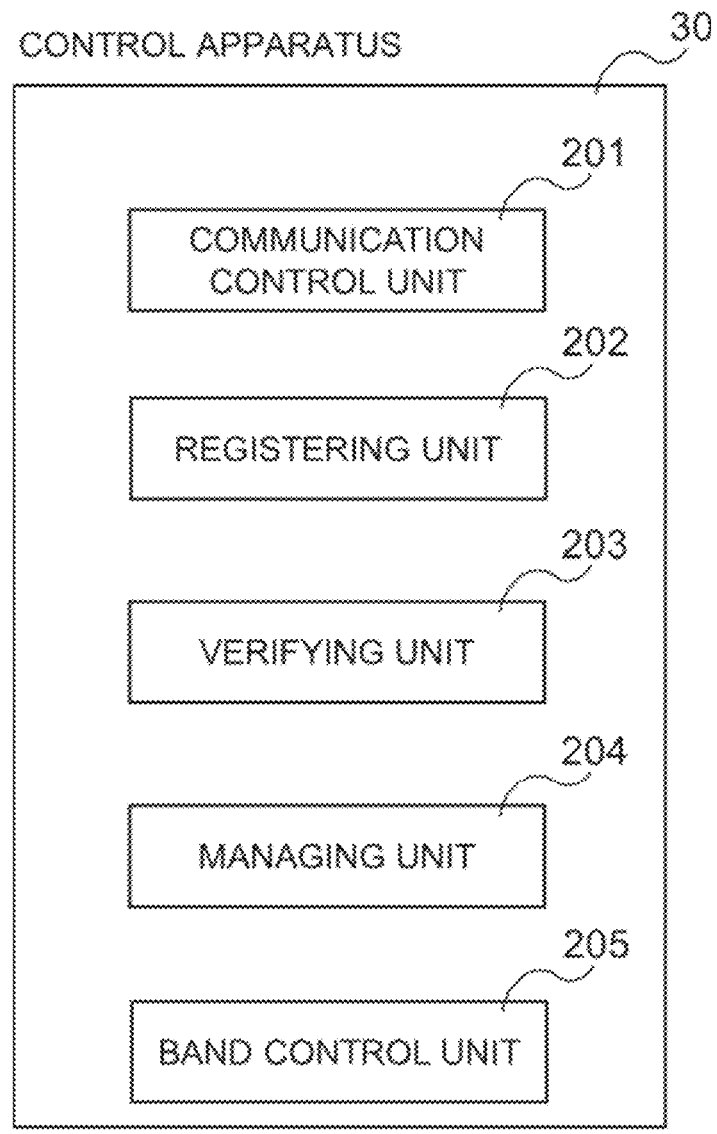
FIG. 13 is a diagram illustrating an example of a processing configuration of a control apparatus according to the third example embodiment.

FIG. 13 is a diagram illustrating an example of a processing configuration (processing module) of the control apparatus 30 according to the third example embodiment. With reference to FIG. 13, a band control unit 205 is added to the configuration illustrated in FIG. 3. In the second and third example embodiments, the addition of the band control unit 205 and operation of the verifying unit 203 are different.

Figure 14:
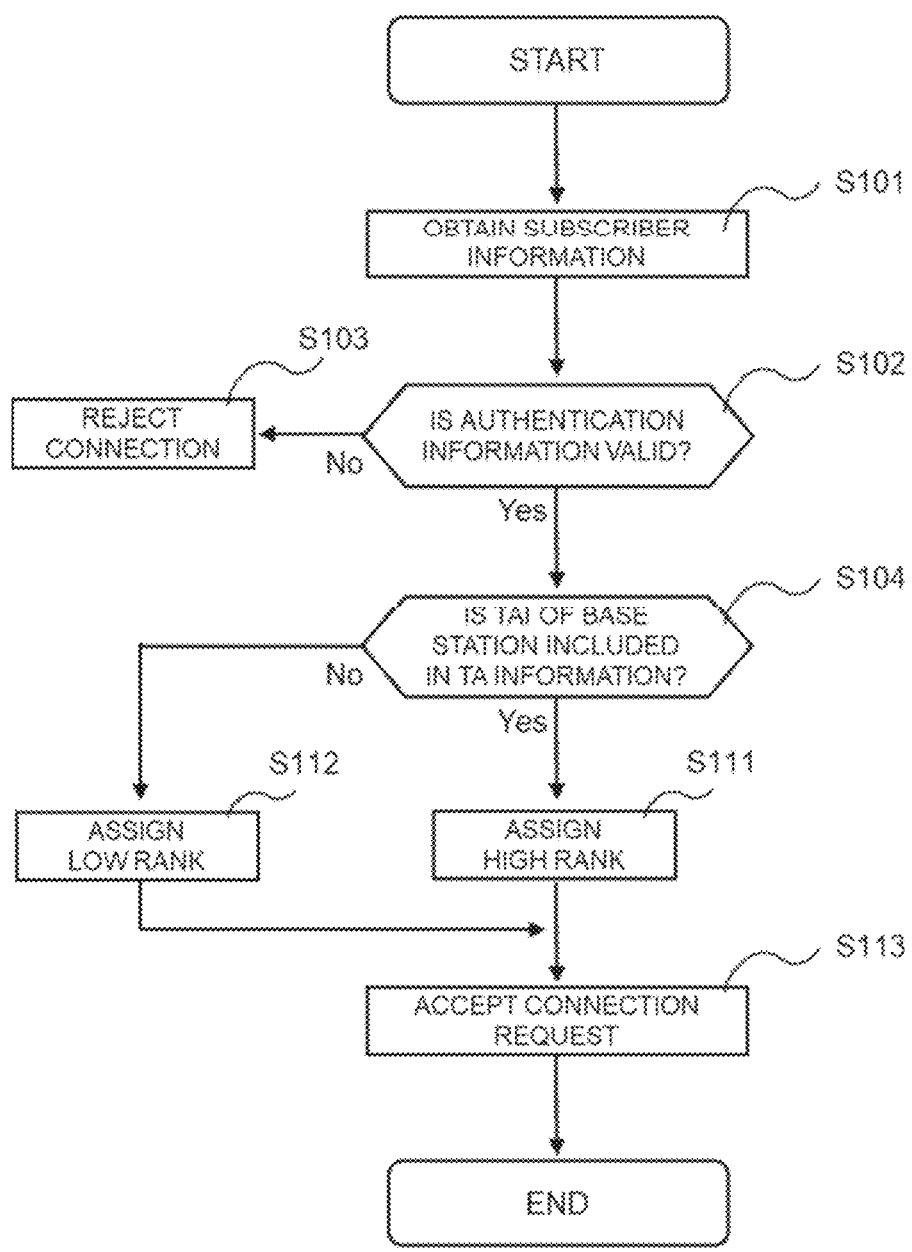
FIG. 14 is a flowchart illustrating an example of operation of a verifying unit according to the third example embodiment.

FIG. 14 is a flowchart illustrating an example of operation of the verifying unit 203 according to the third example embodiment. Note that, in FIG. 12 and FIG. 14, the same processes are denoted by the same reference signs (steps), and detailed description thereof will thus be omitted.

The verifying unit 203 according to the third example embodiment classifies (assigns a rank to) the terminal apparatuses 20 that transmit the connection request according to determination results of Step S104.

Specifically, when the connection request is transmitted via the base station 10 that forms the cell of the TAI in which serving is permitted (Step S104, Yes branch), the verifying unit 203 assigns a high rank to the terminal apparatus 20 that transmitted the connection request to the base station 10 (Step S111).

In contrast, when the connection request is not transmitted via the base station 10 that forms the cell of the TAI in which serving is permitted (Step S104, No branch), the verifying unit 203 assigns a low rank to the terminal apparatus 20 that transmitted the connection request to the base station 10 (Step S112).

After assigning a rank to the terminal apparatus 20 (determining priority of the terminal apparatus 20), the verifying unit 203 transmits a connection request accept to the terminal apparatus 20 (Step S113).

The band control unit 205 determines the band to be assigned to each terminal apparatus 20 according to the verification results (assigned rank of the terminal apparatus 20, priority) of the verifying unit 203. The band control unit 205 transmits the determined band as well as an identifier of the terminal apparatus 20 to the apparatus capable of band control such as the gateway apparatus 50.

The base station 10 that has received the band and the identifier of the terminal apparatus 20 controls a resource (frequency band or the like) to be assigned to each terminal apparatus 20 and implements the band control. Alternatively, the gateway apparatus 50 implements the band control by means of control referred to as shaping and policing.

Alternatively, the band control unit 205 may change the band of each terminal apparatus 20 in real time according to a radio access state of the system. For example, the band control unit 205 tallies up and manages the number of connected terminals for each base station 10. The band control unit 205 may control the band of each terminal apparatus 20, based on the number of connected terminals and the verification results by the verifying unit 203 (verification results based on the TA information).

For example, the band control unit 205 performs threshold processing on the number of connected terminals, and when more terminal apparatuses 20 than a predetermined number are connected to one base station 10, the band control unit 205 narrows the band of the terminal apparatus 20 having a low rank out of the terminal apparatuses 20 connected to the one base station 10.

As described above, the control apparatus 30 according to the third example embodiment assigns a rank of access authority to the terminal apparatus that requests connection, based on results of the verification based on the TAI. Subsequently, the control apparatus 30 controls the communication band of the terminal apparatus, based on the assigned rank of the access authority. As a result, communication control according to an attribute of the terminal apparatus 20 (for example, a department to which the terminal apparatus 20 belongs or the like) in a multi-tenant environment is implemented.

Figure 15:
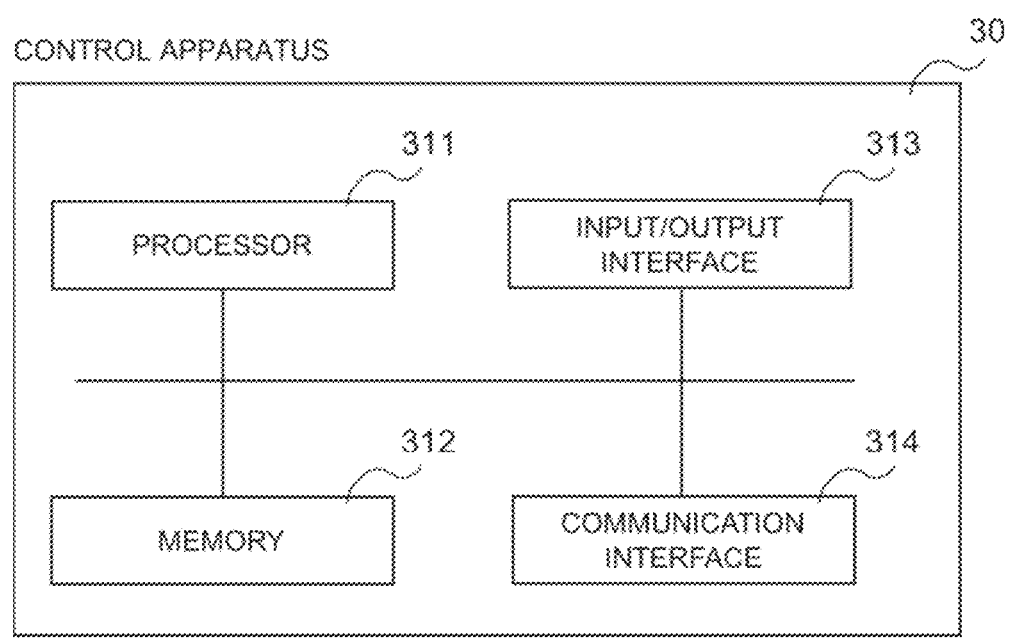
FIG. 15 is a diagram illustrating an example of a hardware configuration of the control apparatus.

Next, hardware of each apparatus constituting the radio communication system will be described. FIG. 15 is a diagram illustrating an example of a hardware configuration of the control apparatus 30.

The control apparatus 30 can be configured with an information processing apparatus (so-called computer), and includes a configuration illustrated in FIG. 15. For example, the control apparatus 30 includes a processor 311, a memory 312, an input/output interface 313, a communication interface 314, and the like. The constituent elements such as the processor 311 are connected with an internal bus or the like, and are configured to be capable of communicating with each other.

Note that the configuration illustrated in FIG. 15 is not to limit the hardware configuration of the control apparatus 30. The control apparatus 30 may include hardware (not illustrated), or may not include the input/output interface 313 as necessary. The number of processors 311 and the like included in the control apparatus 30 is not to be limited to the example of FIG. 15 either, and for example, a plurality of processors 311 may be included in the control apparatus 30.

The processor 311 is, for example, a programmable device such as a Central Processing Unit (CPU), a Micro Processing Unit (MPU), and a Digital Signal Processor (DSP). Alternatively, the processor 311 may be a device such as a Field Programmable Gate Array (FPGA) and an Application Specific Integrated Circuit (ASIC). The processor 311 executes various programs including an Operating System (OS).

The memory 312 is a Random Access Memory (RAM), a Read Only Memory (ROM), a Hard Disk Drive (HDD), a Solid State Drive (SSD), or the like. The memory 312 stores OS programs, application programs, and various pieces of data.

The input/output interface 313 is an interface of a display apparatus and an input apparatus (not illustrated). The display apparatus is, for example, a liquid crystal display or the like. The input apparatus is, for example, an apparatus that receives user operation, such as a keyboard and a mouse.

The communication interface 314 is a circuit, a module, or the like that performs communication with another apparatus. For example, the communication interface 314 includes a Network Interface Card (NIC) or the like.

The function of the control apparatus 30 is implemented with various processing modules. The processing module is, for example, implemented by the processor 311 executing a program stored in the memory 312. The program can be recorded in a computer-readable storage medium. The storage medium may be a non-transitory storage medium such as a semiconductor memory, a hard disk, a magnetic recording medium, and an optical recording medium. In other words, the present invention can also be implemented as a computer program product. The program can be updated through downloading via a network or by using a storage medium storing a program. In addition, the processing module may be implemented with a semiconductor chip.

Note that the relay apparatus 40, the gateway apparatus 50, and the like can also be configured with an information processing apparatus as with the case of the control apparatus 30, and since there is no difference in a basic hardware configuration thereof from that of the control apparatus 30, description thereof will be omitted.

[Example Alterations]

The configuration, the operation, and the like of the radio communication system described in the example embodiments are examples, and are not to limit the configuration and the operation of the system. For example, the subscriber information registered in the subscriber information database 60 may be encrypted. In particular, the authentication information may be encrypted and registered in the subscriber information database 60. In such a case, the control apparatus 30 may distribute a private key for encryption to the SIM provider, and the encrypted subscriber information (authentication information) may be decoded with a corresponding public key.

The above example embodiments describe a case in which the managing unit 204 is included in the control apparatus 30. However, the managing unit need not be included in the control apparatus 30. In other words, the function of the managing unit 204 may be implemented with another apparatus. The control apparatus 30 need not include a part or all of the managing unit 204 described in the above.

The SIM provider may provide a digital signature to the generated subscriber information. In this case, when the control apparatus 30 being a receiver of the subscriber information succeeds in confirmation of validity of the digital signature, the control apparatus 30 registers the subscriber information with the subscriber information database 60. For example, as described above, when the FQDN is used as the SIM provider ID, the SIM provider provides a signature generated based on the FQDN for the subscriber information at the time of providing the subscriber information. The signature indicates that the provided subscriber information is valid information provided by the SIM provider being a generator of the subscriber information. When the control apparatus 30 verifies the signature and determines that the signature is not a valid signature, the control apparatus 30 can reject the provided subscriber information. As a result, a security level of the system is enhanced. The following operation can also be performed: in the subscriber information database 60, data of the SIM provider that has imported (read) the subscriber information with the signature is overwritten only when a correct signature of the same SIM provider is provided.

The first example embodiment and the second and third example embodiments may be combined together. In other words, the subscriber information with a set term of validity is stored in the subscriber information database 60, and the control apparatus 30 holds the TA information. In this state, the control apparatus 30 may execute the authentication processing of the terminal apparatus 20 using the authentication information, the first verification processing using the term of validity, and the second verification processing using the TA information.

The second example embodiment describes a case in which the TA information is stored in the control apparatus 30. However, the subscriber information registered in the subscriber information database 60 and the TA information may be merged. In this case, for example, the managing unit 204 may obtain the TA information, and information related to the servable TAI may be added to the entry of the subscriber information having the same IMSI.

In the example embodiments, the unit of the term of validity is a "day". However, "time" may be included in the term of validity.

In the example embodiments, after the authentication processing using the authentication information, verification processing using other information (term of validity, TA information) is executed. However, the order of these processings may be inverted.

The registering unit 202 may create the subscriber information for each user (subscriber) who is to use the radio communication system in the subscriber information database 60 in advance. In this case, the registering unit 202 may create by using the subscriber information obtained from the SIM provider in advance, and overwrite the entry of the subscriber information. Alternatively, the registering unit 202 may determine an initial value (default value) regarding the term of validity of the subscriber information, and create the subscriber information. As a result, the subscriber information without a set term of validity (indefinite subscriber information) can be prevented from being registered in the subscriber information database 60.

In the subscriber information stored in the subscriber information database 60, a field for storing ancillary information such as a name of a user, a department to which the user belongs, and an extension number of the user may be provided. In this case, even when the term of validity is expired and the subscriber information is to be deleted, when the ancillary information is not blank but some information is written, the control apparatus 30 may notify the administrator or the like of such by using the email address, the monitoring apparatus, or the like. In other words, each entry of the subscriber information registered in the subscriber information database 60 includes a field of the ancillary information indicating an attribute of a corresponding user. When there is subscriber information satisfying a predetermined condition (subscriber information to be deleted) and in which a value is written in the field of the ancillary information, the managing unit 204 notifies the monitoring apparatus or the like of the existence of the subscriber information in which the value is written in the field of the ancillary information.

The example embodiments describe a case in which the control apparatus 30 executes the authentication processing and the verification processing. However, one or both of these may be executed in the subscriber information database 60. The control apparatus 30 may deliver the subscriber information received via the base station 10 to the subscriber information database 60, and the authentication and verification described above may be performed in the database. The subscriber information database 60 may notify the control apparatus 30 of results of the authentication and verification, and the control apparatus 30 may transmit the notification to the terminal apparatus 20. In other words, the function that the control apparatus 30 (for example, the MME in a case of LTE) authenticates and identifies the terminal apparatus 20 based on the subscriber information may be provided with an HSS node.

As the control apparatus 30 described in the example embodiments, a calculator (information processing apparatus) including a processor, a memory, and the like is assumed. Alternatively, the control apparatus 30 may be a virtual machine that emulates a plurality of computers on one computer. In other words, the control apparatus 30 may be a calculator (physical machine) such as a server, or may be a virtual machine.

The core network 12 may be physically configured with a plurality of apparatuses (nodes), or may be physically configured with one apparatus. For example, in the latter case, the core network 12 may be constructed using Network Functions Virtualization (NFV) in which a communication network function is virtualized and the function is implemented with a general-purpose server.

In the plurality of flowcharts used for description provided above, the order of a plurality of steps (processes) is illustrated. However, the execution order of the steps executed in each example embodiment is not limited to the illustrated order. In each example embodiment, for example, the order of the steps illustrated in the figures can be changed such as in a manner of executing the processes in parallel, as long as there is no problem caused in the contents. Example embodiments described above can be combined as long as there is no inconsistency in the contents.

The whole or part of the example embodiments above can be described as, but not limited to, the following supplementary notes.

[Supplementary Note 1]

A control apparatus (30, 100) comprising:
an obtaining unit (101, 201) configured to obtain subscriber information related to a subscriber in a private radio communication network; and
a verifying unit (102, 203) configured to perform authentication processing for a terminal apparatus (20-1, 20-2, 21-1, 21-2) requesting connection to the private radio communication network, based on authentication information included in the subscriber information, and to verify access authority for the terminal apparatus (20-1, 20-2, 21-1, 21-2) requesting the connection, based on information different from the authentication information included in the subscriber information when the authentication processing for the terminal apparatus (20-1, 20-2, 21-1, 21-2) requesting the connection is successful.

[Supplementary Note 2]

The control apparatus (30, 100) according to supplementary note 1, further comprising
a registering unit (202) configured to obtain subscriber information generated by a Subscriber Identity Module (SIM) provider, and to register the obtained subscriber information in a database (60) included in a core network.

[Supplementary Note 3]

The control apparatus (30, 100) according to supplementary note 2, wherein
the verifying unit (102, 203) is configured to perform the authentication processing for the terminal apparatus (20-1, 20-2, 21-1, 21-2) requesting the connection by using the authentication information included in the subscriber information registered in the database (60) and the authentication information included in a connection request from the terminal apparatus (20-1, 20-2, 21-1, 21-2) requesting the connection.

[Supplementary Note 4]

The control apparatus (30, 100) according to supplementary note 3, wherein
when an attach request or a tracking area update request is received from the terminal apparatus (20-1, 20-2, 21-1, 21-2) requesting the connection, the verifying unit (102, 203) is configured to transmit, to the terminal apparatus (20-1, 20-2, 21-1, 21-2) requesting the connection, a response message with a predetermined value stored in a cause value when rejecting the connection request from the terminal apparatus (20-1, 20-2, 21-1, 21-2) requesting the connection.

[Supplementary Note 5]

The control apparatus (30, 100) according to supplementary note 4, wherein
the information different from the authentication information included in the subscriber information is a term of validity for the subscriber information.

[Supplementary Note 6]

The control apparatus (30, 100) according to supplementary note 5, further comprising
a managing unit (204) configured to manage the subscriber information registered in the database (60), wherein
the managing unit (204) is configured to delete the subscriber information satisfying a predetermined condition out of the subscriber information registered in the database (60).

[Supplementary Note 7]

The control apparatus (30, 100) according to supplementary note 6, wherein
the managing unit (204) is configured to notify an external monitoring apparatus of existence of the subscriber information satisfying the predetermined condition before deleting the subscriber information satisfying the predetermined condition.

[Supplementary Note 8]

The control apparatus (30, 100) according to supplementary note 7, wherein
each entry of the subscriber information registered in the database (60) comprises a field of ancillary information indicating an attribute of a corresponding user, and
when the subscriber information with a value being written in the field of the ancillary information, the subscriber information satisfying the predetermined condition, exists, the managing unit (204) is configured to notify the monitoring apparatus of the existence of the subscriber information with the value being written in the field of the ancillary information.

[Supplementary Note 9]

The control apparatus (30, 100) according to supplementary note 4, wherein
the information different from the authentication information included in the subscriber information is information of a servable tracking area for the terminal apparatus (20-1, 20-2, 21-1, 21-2) requesting the connection.

[Supplementary Note 10]

The control apparatus (30, 100) according to supplementary note 9, wherein
the obtaining unit (101, 201) is configured to obtain tracking area information in which an identifier of each terminal apparatus (20-1, 20-2, 21-1, 21-2) and a servable Tracking Area Identity (TAT) are associated with each other, and
the verifying unit (102, 203) is configured to verify the access authority for the terminal apparatus (20-1, 20-2, 21-1, 21-2) requesting the connection, depending on whether or not a TAI for specifying a cell of a base station that forwards the connection request of the terminal apparatus (20-1, 20-2, 21-1, 21-2) requesting the connection is included in the tracking area information as a TAI of the terminal apparatus (20-1, 20-2, 21-1, 21-2) requesting the connection.

[Supplementary Note 11]

The control apparatus (30, 100) according to supplementary note 10, wherein
the verifying unit (102, 203) is configured to assign a rank of the access authority to the terminal apparatus (20-1, 20-2, 21-1, 21-2) requesting the connection, based on the result of the verification based on the TAI, and
the control apparatus (30, 100) further comprises a band control unit (205) configured to control a communication band of the terminal apparatus (20-1, 20-2, 21-1, 21-2), based on the assigned rank of the access authority.

[Supplementary Note 12]

A radio communication system comprising:
an obtaining means (101, 201) for obtaining subscriber information related to a subscriber in a private radio communication network; and
a verifying means (102, 203) for performing authentication processing for a terminal apparatus (20-1, 20-2, 21-1, 21-2) requesting connection to the private radio communication network, based on authentication information included in the subscriber information, and verifying access authority for the terminal apparatus (20-1, 20-2, 21-1, 21-2) requesting the connection, based on information different from the authentication information included in the subscriber information when the authentication processing for the terminal apparatus (20-1, 20-2, 21-1, 21-2) requesting the connection is successful.

[Supplementary Note 13]

A control method used in a control apparatus (30, 100) that controls mobility of a terminal apparatus (20-1, 20-2, 21-1, 21-2), the control method comprising the steps of:
obtaining subscriber information related to a subscriber in a private radio communication network; and
performing authentication processing for a terminal apparatus (20-1, 20-2, 21-1, 21-2) requesting connection to the private radio communication network, based on authentication information included in the subscriber information, and verifying access authority for the terminal apparatus (20-1, 20-2, 21-1, 21-2) requesting the connection, based on information different from the authentication information included in the subscriber information when the authentication processing for the terminal apparatus (20-1, 20-2, 21-1, 21-2) requesting the connection is successful.

[Supplementary Note 14]

A program that causes a computer mounted on a control apparatus (30, 100) controlling mobility of a terminal apparatus (20-1, 20-2, 21-1, 21-2) to execute:
obtaining subscriber information related to a subscriber in a private radio communication network;
performing authentication processing for a terminal apparatus (20-1, 20-2, 21-1, 21-2) requesting connection to the private radio communication network, based on authentication information included in the subscriber information; and verifying access authority for the terminal apparatus (20-1, 20-2, 21-1, 21-2) requesting the connection, based on information different from the authentication information included in the subscriber information when the authentication processing for the terminal apparatus (20-1, 20-2, 21-1, 21-2) requesting the connection is successful.

Note that, similarly to the mode of supplementary note 1, the mode of supplementary note 12 to the mode of supplementary note 14 can be developed into the mode of supplementary note 2 to the mode of supplementary note 11.

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

This application claims priority to JP 2019-075370 filed on Apr. 11, 2019, the entire disclosure of which is incorporated herein.

INDUSTRIAL APPLICABILITY

In the radio communication system, access control of a user in a private radio communication network can be implemented.

REFERENCE SIGNS LIST 10, 10-1, 10-2 Base station
11 Radio access network
12 Core network
20, 20-1, 20-2, 21-1, 21-2 Terminal apparatus
30, 100 Control apparatus
40 Relay apparatus
50 Gateway apparatus
60 Subscriber information database
70 Server of SIM provider
101 Obtaining unit
102, 203 Verifying unit
201 Communication control unit
202 Registering unit
204 Managing unit
205 Band control unit
311 Processor
312 Memory
313 Input/output interface
314 Communication interface

What is claimed is:

1. A core network node in a fifth generation (5G) mobile communication system including a terminal apparatus, an Access and Mobility Management Function (AMF) node and a Unified Data Management (UDM) node for a subscriber information database, the core network node comprising:
one or more memories configured to store instructions; and
one or more processors configured to execute the instructions to:
receive a request message based on the terminal apparatus in a private communication network;
receive, from the UDM node, first information related to the terminal apparatus and second information related to authentication;
perform authentication processing using the second information for the terminal apparatus requesting connection to the private communication network; and
verify access authority of the terminal apparatus using the first information after the authentication processing for the terminal apparatus requesting the connection is successful.

2. An authentication method used for a core network node in a fifth generation (5G) mobile communication system including a terminal apparatus, an Access and Mobility Management Function (AMF) node and a Unified Data Management (UDM) node for a subscriber information database, the authentication method comprising:
receiving a request message based on the terminal apparatus in a private communication network;
receiving, from the UDM node, first information related to the terminal apparatus and second information related to the authentication;
performing authentication processing using the second information for the terminal apparatus requesting connection to the private radio communication network; and
verifying access authority of the terminal apparatus using the first information after the authentication processing for the terminal apparatus requesting the connection is successful.

* * * * *